US012726486B2

(12) United States Patent
Vinberg et al.

(10) Patent No.: US 12,726,486 B2
(45) Date of Patent: Sep. 1, 2026

(54) SYSTEMS AND METHODS FOR IDENTIFYING TRUSTWORTHINESS OF DATA

(71) Applicants: Lars Vinberg, Mountain View, CA (US); Nicolai Wadstrom, Redwood City, CA (US); Erik Starck, Malmö (SE); Shmuel Silverman, Novato, CA (US)

(72) Inventors: Lars Vinberg, Mountain View, CA (US); Nicolai Wadstrom, Redwood City, CA (US); Erik Starck, Malmö (SE); Shmuel Silverman, Novato, CA (US)

(73) Assignee: Multi-Innovation Inc., Novato, CA (US)

( * ) Notice: Subject to any disclaimer, the term of this patent is extended or adjusted under 35 U.S.C. 154(b) by 0 days.

(21) Appl. No.: 18/818,979

(22) Filed: Aug. 29, 2024

(65) Prior Publication Data

US 2025/0080545 A1 Mar. 6, 2025

Related U.S. Application Data

(60) Provisional application No. 63/589,001, filed on Oct. 9, 2023, provisional application No. 63/579,729, filed on Aug. 30, 2023.

(51) Int. Cl.
*H04L 9/40* (2022.01)

(52) U.S. Cl.
CPC .................................... *H04L 63/12* (2013.01)

(58) Field of Classification Search
None
See application file for complete search history.

(56) References Cited

U.S. PATENT DOCUMENTS

| | | | | |
|---|---|---|---|---|
| 11,435,192 | B1 * | 9/2022 | Ebrahimi Afrouzi | G01S 17/89 |
| 12,170,670 | B2 * | 12/2024 | O'Neill | H04L 63/102 |
| 2006/0294134 | A1 * | 12/2006 | Berkhim | G06F 16/313 707/E17.084 |
| 2011/0191847 | A1 * | 8/2011 | Davis | H04L 63/1483 709/224 |
| 2016/0277424 | A1 * | 9/2016 | Mawji | G06Q 50/01 |
| 2017/0249315 | A1 * | 8/2017 | Mawji | G06Q 50/01 |
| 2020/0086862 | A1 * | 3/2020 | Cui | G06N 3/006 |
| 2020/0296128 | A1 * | 9/2020 | Wentz | H04L 63/1433 |
| 2021/0073647 | A1 * | 3/2021 | Hunter | G06F 16/1858 |

(Continued)

*Primary Examiner* — Michael W Chao
(74) *Attorney, Agent, or Firm* — Aurora Consulting LLC; Kristen J. Hansen; Ashley Sloat

(57) ABSTRACT

Systems and methods are described for determining trustworthiness. The systems and methods may perform obtaining a plurality of nodes associated with a first entity, wherein the plurality of nodes correspond to one or more additional entities, each of the one or more additional entities being defined by a trust metric, a relationship indication, and at least one activation function, generating, for each of the plurality of nodes, an output by executing each activation function according to a set of predefined rules defined for the plurality of nodes, wherein each activation function uses a respective trust metric defined for the one or more additional entities, and generating a model for determining trustworthiness of the first entity based on each relationship indication and the output for each of the plurality of nodes.

28 Claims, 11 Drawing Sheets

(56) References Cited

U.S. PATENT DOCUMENTS

| | | | | |
|---|---|---|---|---|
| 2023/0300150 | A1* | 9/2023 | O'Neill | H04L 63/102 726/22 |
| 2023/0319358 | A1* | 10/2023 | Jalan | H04N 21/4666 725/46 |
| 2024/0005911 | A1* | 1/2024 | Guan | G10L 15/1822 |
| 2024/0064063 | A1* | 2/2024 | Hall | G06F 18/21 |
| 2024/0098086 | A1* | 3/2024 | Iranitalab | H04L 63/105 |

* cited by examiner

SYSTEMS AND METHODS FOR IDENTIFYING TRUSTWORTHINESS OF DATA

CROSS-REFERENCE TO RELATED APPLICATION

This application claims the priority benefit of U.S. Provisional Application No. 63/589,001, filed Oct. 9, 2023, and U.S. Provisional Application No. 63/579,729, filed on Aug. 30, 2023, the disclosures of which is herein incorporated by reference in their entireties.

TECHNICAL FIELD

The present disclosure generally relates to systems and methods for assessing trust between entities, trust in entities, and trust in information.

BACKGROUND

Digital anonymity and uncertainty in identity create opportunities for fraud and deception at an enormous cost today. Examples include disinformation in news and fact reporting, criminal fraud, friction and barriers in international trade, and many more in all aspects of life.

In today's world, communication between entities can be secure in the sense that eavesdropping is preventable, but the entities cannot be sure about the intents of each other nor the content that is exchanged between them. The question is: "Can person 'A' trust person 'B'? For such an example, there are some conventional tools to establish trust and reduce uncertainty, including managing corporate credentials by using a class of tools trying to establish authentication and identity; performing credit and background using a class of tools to condense financial information about people to make financial decisions; and performing general source verification based on existing databases using database search tools employed by using background check tools.

SUMMARY

In some aspects, the techniques described herein relate to a computer-implemented method for determining trustworthiness of data. The method may include obtaining a plurality of nodes associated with a first entity, wherein the plurality of nodes correspond to one or more additional entities, each of the one or more additional entities being defined by a trust metric, a relationship indication, and at least one activation function, generating, for each of the plurality of nodes, an output by executing each activation function according to a set of predefined rules defined for the plurality of nodes, wherein each activation function uses a respective trust metric defined for the one or more additional entities, and generating a model for determining trustworthiness of the first entity based at least in part on each relationship indication and the output for each of the plurality of nodes.

In some aspects, the techniques described herein relate to a computer-implemented method, further including: receiving a request to determine trustworthiness of the first entity, the request including at least one parameter; generating, using the model and the at least one parameter, an aggregated trust metric for the first entity; and generating a graphical view of the model based on the aggregated trust metric.

In some aspects, the techniques described herein relate to a computer-implemented method, wherein: each node is a statement or entity associated with the first entity; and the model is a trust network including a plurality of neural networks configured to execute, in parallel, each activation function to generate an aggregated trust metric for the first entity based on the trust metric and relationship indication for each statement or entity.

In some aspects, the techniques described herein relate to a computer-implemented method, wherein the trust network represents an uncertainty network influenced by one or more entities associated with one or more of the plurality of nodes.

In some aspects, the techniques described herein relate to a computer-implemented method, further including: receiving an additional node from a second entity, the additional node being defined by at least one trust indicator and a relationship to the first entity; generating, using the model, an aggregated trust metric for the first entity; biasing the aggregated trust metric according to the at least one trust indicator; and generating a graphical view of the model, the graphical view depicting an influence of the at least one trust indicator.

In some aspects, the techniques described herein relate to a computer-implemented method, wherein: the aggregated trust metric represents a probability of the first entity being trustworthy; and the at least one trust indicator modifies the probability.

In some aspects, the techniques described herein relate to a computer-implemented method, further including: in response to receiving one or more updated trust metrics associated with one or more of the plurality of nodes associated with the first entity: generating an updated model based on the one or more updated trust metrics and the respective activation functions associated with additional entities having an updated trust metric; and generating, using the updated model, an updated aggregated trust metric and generating a graphical user interface of the model based on the updated aggregated trust metric.

In some aspects, the techniques described herein relate to a computer-implemented method, wherein: the plurality of nodes are conditioned on at least one node context; and the generating of the output for each of the plurality of nodes is based on feeding the at least one node context into at least one of the activation functions.

In some aspects, the techniques described herein relate to a computer-implemented method, wherein: the set of predefined rules includes a plurality of learning rules that when used during execution of each activation function: modifies at least one trust metric of at least one of the plurality of nodes; and generates, using the model and the at least one modified trust metric, an updated aggregated trust metric.

In some aspects, the techniques described herein relate to a system including: at least one processing device; and memory storing instructions that when executed cause the processing device to perform operations including: obtaining a plurality of nodes associated with a first entity, wherein the plurality of nodes correspond to one or more additional entities, each of the one or more additional entities being defined by a trust metric, a relationship indication, and at least one activation function; generating, for each of the plurality of nodes, an output by executing each activation function according to a set of predefined rules defined for the plurality of nodes, wherein each activation function uses a respective trust metric defined for the one or more additional entities; and generating a model for determining trustworthiness of the first entity based on each relationship indication and the output for each of the plurality of nodes.

In some aspects, the techniques described herein relate to a system, wherein the operations further include: receiving a request to determine trustworthiness of the first entity, the request including at least one parameter; generating, using the model and the at least one parameter, an aggregated trust metric for the first entity; and generating a graphical view of the model based on the aggregated trust metric.

In some aspects, the techniques described herein relate to a system, wherein: each node is a statement or entity associated with the first entity; and the model is a trust network including a plurality of neural networks configured to execute, in parallel, each activation function to generate an aggregated trust metric for the first entity based on the trust metric and relationship indication for each statement or entity.

In some aspects, the techniques described herein relate to a system, in which the trust network represents an uncertainty network influenced by one or more entities associated with one or more of the plurality of nodes.

In some aspects, the techniques described herein relate to a system, wherein the operations further include: receiving an additional node from a second entity, the additional node being defined by at least one trust indicator and a relationship to the first entity; generating, using the model, an aggregated trust metric for the first entity; biasing the aggregated trust metric according to the at least one trust indicator; and generating a graphical view of the model, the graphical view depicting an influence of the at least one trust indicator.

In some aspects, the techniques described herein relate to a system, wherein: the aggregated trust metric represents a probability of the first entity being trustworthy; and the at least one trust indicator modifies the probability.

In some aspects, the techniques described herein relate to a system, wherein the operations further include: in response to receiving one or more updated trust metrics associated with one or more of the plurality of nodes associated with the first entity: generating an updated model based on the one or more updated trust metrics and the respective activation functions associated with additional entities having an updated trust metric; and generating, using the updated model, an updated aggregated trust metric and generating a graphical user interface of the model based on the updated aggregated trust metric.

In some aspects, the techniques described herein relate to a system, wherein: the plurality of nodes are conditioned on at least one node context; and the generating of the output for each of the plurality of nodes is based on feeding the at least one node context into at least one of the activation functions.

In some aspects, the techniques described herein relate to a system, wherein: the set of predefined rules includes a plurality of learning rules that when used during execution of each activation function: modifies at least one trust metric of at least one of the plurality of nodes; and generates, using the model and the at least one modified trust metric, an updated aggregated trust metric.

In some aspects, the techniques described herein relate to a non-transitory computer-readable medium including: at least one processor; and a memory storing instructions that, when executed by the at least one processor, cause the at least one processor to perform operations including: obtaining a plurality of nodes associated with a first entity, wherein the plurality of nodes correspond to one or more additional entities, each of the one or more additional entities being defined by a trust metric, a relationship indication, and at least one activation function; generating, for each of the plurality of nodes, an output by executing each activation function according to a set of predefined rules defined for the plurality of nodes, wherein each activation function uses a respective trust metric defined for the one or more additional entities; and generating a model for determining trustworthiness of the first entity based on each relationship indication and the output for each of the plurality of nodes.

In some aspects, the techniques described herein relate to a non-transitory computer-readable medium, wherein the operations further include: receiving a request to determine trustworthiness of the first entity, the request including at least one parameter; generating, using the model and the at least one parameter, an aggregated trust metric for the first entity; and generating a graphical view of the model based on the aggregated trust metric.

In some aspects, the techniques described herein relate to a non-transitory computer-readable medium, wherein: each node is a statement or entity associated with the first entity; and the model is a trust network including a plurality of neural networks configured to execute, in parallel, each activation function to generate an aggregated trust metric for the first entity based on the trust metric and relationship indication for each statement or entity.

In some aspects, the techniques described herein relate to a non-transitory computer-readable medium, wherein the trust network represents an uncertainty network influenced by one or more entities associated with one or more of the plurality of nodes.

In some aspects, the techniques described herein relate to a non-transitory computer-readable medium, wherein the operations further include: receiving an additional node from a second entity, the additional node being defined by at least one trust indicator and a relationship to the first entity; generating, using the model, an aggregated trust metric for the first entity; biasing the aggregated trust metric according to the at least one trust indicator; and generating a graphical view of the model, the graphical view depicting an influence of the at least one trust indicator.

In some aspects, the techniques described herein relate to a non-transitory computer-readable medium, wherein: the aggregated trust metric represents a probability of the first entity being trustworthy; and the at least one trust indicator modifies the probability.

In some aspects, the techniques described herein relate to a non-transitory computer-readable medium, wherein the operations further include: in response to receiving one or more updated trust metrics associated with one or more of the plurality of nodes associated with the first entity: generating an updated model based on the one or more updated trust metrics and the respective activation functions associated with additional entities having an updated trust metric; and generating, using the updated model, an updated aggregated trust metric and generating a graphical user interface of the model based on the updated aggregated trust metric.

In some aspects, the techniques described herein relate to a non-transitory computer-readable medium, wherein: the plurality of nodes are conditioned on at least one node context; and the generating of the output for each of the plurality of nodes is based on feeding the at least one node context into at least one of the activation functions.

In some aspects, the techniques described herein relate to a non-transitory computer-readable medium, wherein: the set of predefined rules includes a plurality of learning rules that when used during execution of each activation function: modifies at least one trust metric of at least one of the plurality of nodes; and generates, using the model and the at least one modified trust metric, an updated aggregated trust metric.

The illustrated embodiments are merely examples and are not intended to limit the disclosure. The schematics are drawn to illustrate features and concepts and are not necessarily drawn to scale.

BRIEF DESCRIPTION OF THE DRAWINGS

Like numbers refer to like elements but not necessarily the same or identical elements throughout.

DETAILED DESCRIPTION OF EXAMPLE EMBODIMENTS

Figure 1:
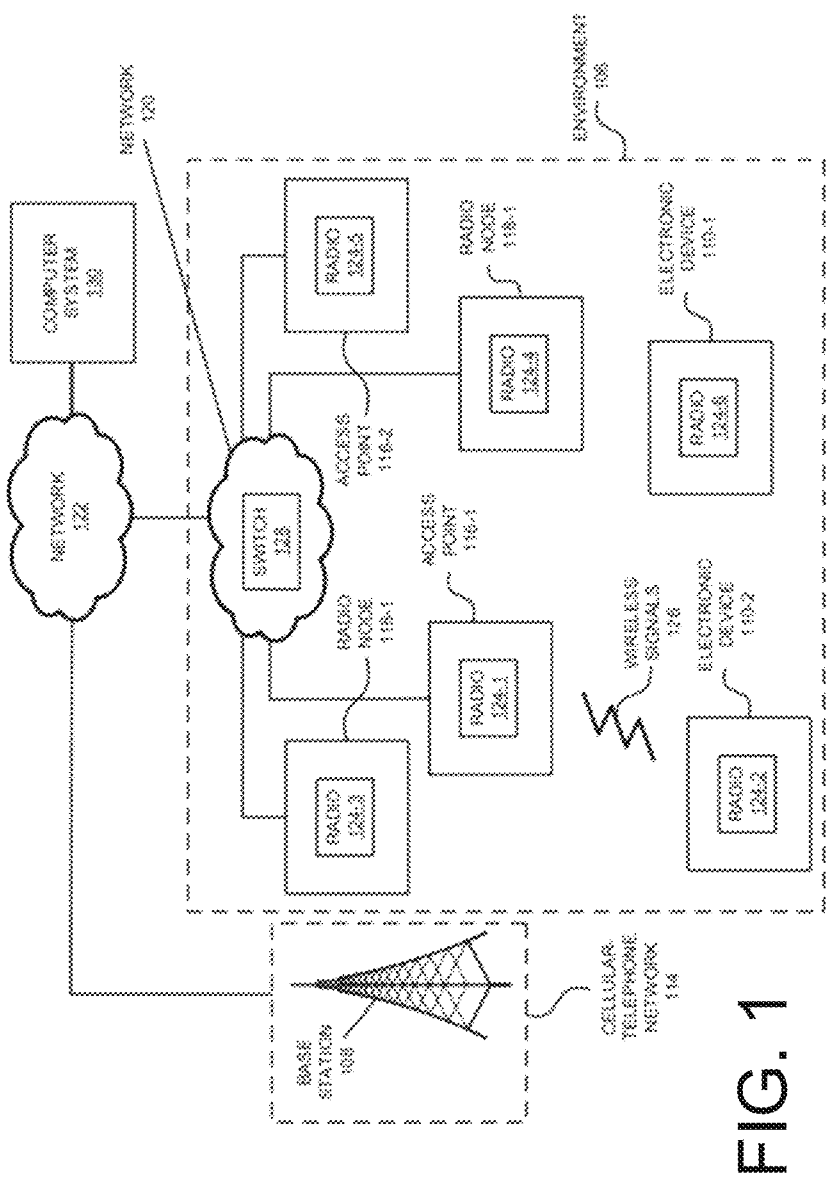
FIG. 1 exemplarily illustrates an example of communication between electronic devices according to some embodiments of the disclosure.

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete and will fully convey the scope to those of ordinary skill in the art.

Many of the daily human life and technology interactions (e.g., human to machine, human to human, and/or machine to machine) take place in the digital world of communications where anyone, including ML-based entities, can speak, claim, or generate fraudulent information or content. For example, to train large language models (LLMs), a broad dataset may be scanned and learned using publicly accessible Internet. There is no way today to distinguish between fraudulent information datasets and coherently truthful datasets. Moreover, there is no way to distinguish between actual known facts and generated, human, or machine-fabricated facts.

Therefore, there is a need for systems and methods that can assess and establish trust metrics and/or trust networks that define trust (or lack of trust) between entities, trust in entities, and trust in information. Such assessments can include analyzing statements, contexts, and/or other input about a particular entity (or statement) to dynamically generate models that may be used to understand a level of trust for specific entities, systems, objects, statements, endorsements, data, or the like. In some embodiments, the models described herein may be generated according to predefined rules for a particular entity or trust network, as described elsewhere herein. In addition, because trust is not a unidirectional attribute, i.e., the trust perceived by entity 'A' of entity 'B' also depends, in part, on entity 'A', there is an additional benefit of capturing and assessing observer influences when assessing and establishing such trust metrics. Accordingly, the models described herein can be generated with a way to assess the observer influences and to use such observations (or other data) to influence or bias the model at a later time, such as when additional entities, relationships, and/or statements are added to the model.

As used herein, the term "trust" may represent a confidence level that an entity will, given a particular context, behave predictably. When trust is used as a statement, trust may represent a probability that the statement is true within the given context. Similarly, the probability that the statement is false within the same context may be represented as the uncertainty attached to a statement in the context. Therefore, dynamic uncertainty may be deduced based on the trust and/or the uncertainty by using the context to bias the uncertainty toward user-selected variables. For example, trust may be numerically represented as a trust metric that may be biased by context.

In some embodiments, the trust metric may be provided to the systems described herein as a defined portion of an entity or statement. The trust metric may be valued between zero and one, where zero represents no trust and one represents full trust. Similarly, uncertainty may be numerically represented as an uncertainty metric between zero and one, where zero represents no uncertainty and one represents full uncertainty. Thus, an uncertainty metric may be determined using the equation 1−trust (i.e., 1 minus the trust metric).

Trust in a particular system (or person) can infer knowledge of a level of certainty of the system being able to perform an intended action. Similarly, a lack of trust in the system (or person) can infer knowledge of a level of uncertainty of the system being able to perform the intended action. In addition, a system that can evaluate uncertainty can also evaluate trust. Therefore, there is a need for systems and methods to assess uncertainty and enable the performance of uncertainty assessments dependent on a viewer/observer requesting that may bias or otherwise modify factors pertaining to uncertainty and/or trust by providing user-based input. In some embodiments, the user-based input may be included in the trust metrics and/or trust networks described herein. In some embodiments, trust metrics and trust networks are based on machine generated input.

In general, interactions (e.g., digital or physical) between individuals, organizations, and entities can be captured or modeled in a digital twin universe. This digital twin universe may include entities, statements, and the relationship(s) between the entities and other entities, entities and statements and/or statements and other statements. Entities can be, but are not limited to, a person, an object, an organization, a hardware component or system, or a software system (or process), a machine learning (ML) module, or an artificial intelligence (AI) module. A statement can include any declarative statement. In some examples, the statement can be of a specific structure. In some examples, the statement is not limited to a specific statement structure. In the examples described herein, a node may be used to define an entity. Similarly, a node (e.g., or a socket) may be used to define a statement. In addition, a line (or arrow) connecting nodes (e.g., statements to statements, statements to entities, etc.) may represent an edge that defines a relationship between two nodes (e.g., relationships between two statements, relationships between an entity and a statement, etc.).

The examples described herein include a system that uses graph relationships with specific attributes, context, and/or rules to generate an uncertainty-based model that may be used to assess trustworthiness of particular statements and/or entities. The model may include a graphical representation of the relationships pertaining to an entity (or statement). Each graphical portion may include (or be associated with) a metric that valuates a trust (or distrust) between the entity (or statement) and another graphical portion (e.g., other nodes, edges, other entities, other statements, etc.).

FIG. 1 is a block diagram illustrating an example of communication between electronic devices 110 (such as a cellular telephone, a portable electronic device, or another type of electronic device, etc.) in an environment 106. The environment 106 may be used to view and/or interact with a trust network generated by the techniques described herein. Moreover, electronic devices 110 may optionally communicate amongst one another and/or with the server computer system 130 via a cellular-telephone network 114 (which may include a base station 108), one or more access points 116 (which may communicate using Wi-Fi) in a wireless local area network (WLAN) and/or radio node 118 (which may communicate using LTE or a cellular-telephone data communication protocol) in a small-scale network (such as a small cell). For example, radio node 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio node 118 may be included in one or more networks, such as: a WLAN, a small cell, a local area network (LAN) and/or a cellular-telephone network. In some embodiments, access-points 116 may include a physical access point and/or a virtual access point that is implemented in software in an environment of an electronic device or a computer.

Furthermore, electronic devices 110 may optionally communicate with computer system 130 (which may include one or more computers or servers and which may be implemented locally or remotely to provide storage and/or analysis services and may be programmed with any one of the models generated by the systems and methods described herein and/or neural networks 1020 described herein) using a wireless or wired communication protocol (such as Ethernet) via network 120 and/or 122. Note that networks 120 and 122 may be the same or different networks. For example, networks 120 and/or 122 may be a LAN, an intranet, or the Internet. In some embodiments, the wired communication protocol may include a secured connection over transmission control protocol/Internet protocol (TCP/IP) using hypertext transfer protocol secure (HTTPS). Additionally, in some embodiments, network 120 may include one or more routers and/or switches (such as switch 128).

Electronic devices 110 and/or computer system 130 may implement at least some of the operations in the techniques described herein. As described further below, a given one of the electronic devices (such as electronic device 110-1) and/or computer system 130 may perform at least some of the analysis of data associated with the electronic device 110-1 (such as first detection of a new peripheral, communication via an interface, a change to software or program instructions, a change to a DLL, a change to stored information, etc.) acquired by an agent executing in an environment (such as an operating system) of the electronic device 110-1, and may provide data and/or first-detection information to computer system 130.

In some embodiments, the computer system 130 represents a server computing system while electronic devices 110 represent client computing systems. In some embodiments, the computer system 130 represents a client computing system while electronic devices 110 represent server computing systems. Any or all of computer system 130 and electronic devices 110 may be programmed with one or more neural networks (NNs) 1020 described herein.

Figure 2:
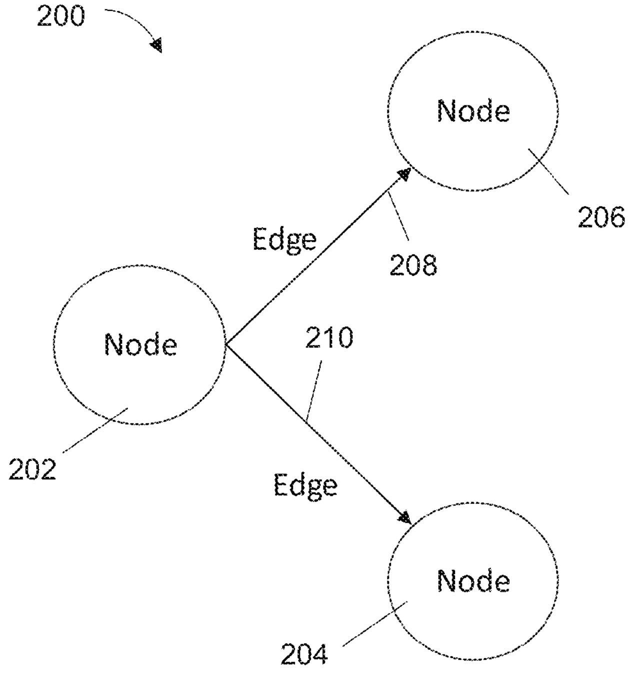
FIG. 2 is a block diagram illustrating an example of a graph concept used according to some embodiments of the disclosure.

FIG. 2 is a block diagram illustrating an example graph 200. The graph 200 may represent an example trust network between one or more nodes, where nodes may be entitles, statements, or the like. As shown, the graph 200 includes nodes (e.g., node 202, node 204, node 206) and edges (e.g., edge 208, edge 210). In general, edges are the connection between the nodes. For example, the node 202 and node 204 are connected by edge 210. Similarly, node 202 and node 206 are connected by edge 208. In an example, an edge can be a verb followed by a subject-verb-object pattern. Edges 208, 210 may be unidirectional and are not limited to any particular nodes. In some embodiments, edges may be bidirectional. Edges and nodes can have attributes and contexts that further characterize and provide further specificity to them. For example, an edge connected to an entity may be further characterized by attributes such as statements. Such statements may also correspond to trust metrics valuating a trustworthiness of those statements being true (e.g., accurate). In some embodiments, the trust metrics may represent initial trust metrics provided by a user or system associated with the statements. In some embodiments, trust metrics may be updated or otherwise modified by the systems described herein based on additional input available for a graph. For example, the systems described herein may update initial trust metrics in response to receiving additional data or detecting changes in one or more other nodes, statements, relationships, or metrics associated with the graph. Similarly, an edge (e.g., edge 208) may be characterized by contexts and trust metrics corresponding to the contexts. Each context and associated trust metric may also be updated according to additional data or detected changes within a particular graph.

Figure 3:
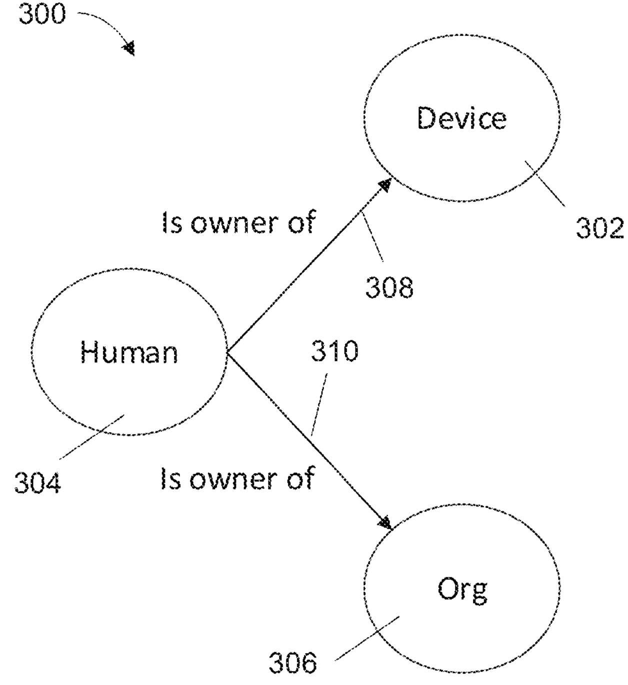
FIG. 3 is a block diagram illustrating an example of an entity ownership concept used according to some embodiments of the disclosure.

FIG. 3 is a block diagram illustrating an example of entity ownership. A graph 300 includes a device node 302, a human node 304, and an organization node 306. The device node 302 is connected to the human node 304 by an edge 308, which indicates that the human node 304 is an owner of the device node 302. The organization node 306 is connected to the human node 304 by an edge 310, which indicates that the human node 304 is an owner of the organization node 302.

In some embodiments, ownership is in the data perspective and may represent real-world legal ownership. Each entity typically includes an owner entity with the exception of a human who, in this model, does not have an owner. An owner entity has rights and responsibilities for its associated objects (not shown). An entity can connect to another entity or statement using a follow connection. A follow connection indicates that the entity is aware of the existence of another entity or statement. An entity may also (or alternatively) connect to another entity using a mutual connection. A mutual connection may indicate a friendship or other relationship (e.g., a close relationship, an acquaintance relationship, a friend of a colleague relationship, etc.).

Figure 4:
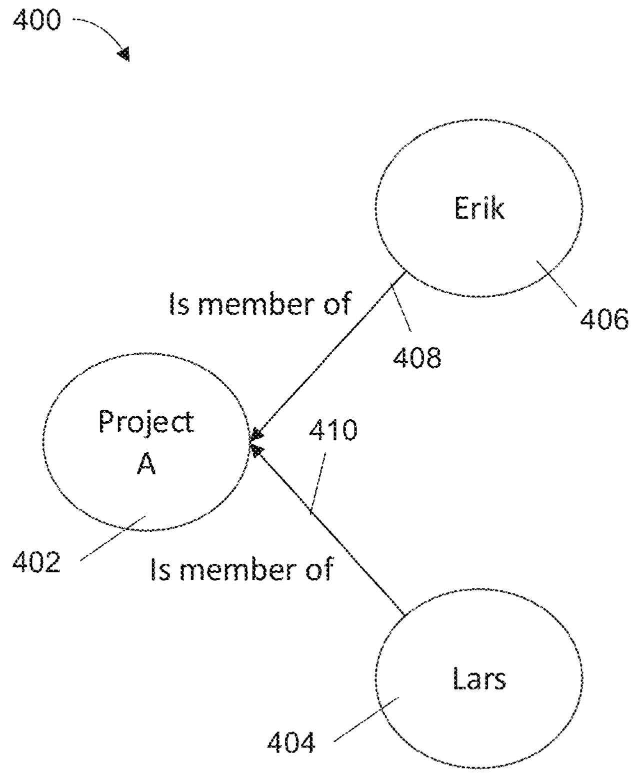
FIG. 4 is a block diagram illustrating an example of groups and memberships concepts used according to some embodiments of the disclosure.

FIG. 4 is a block diagram illustrating an example of groups and memberships. A group is an entity with other entities being members associated with a membership. Membership is an edge type representing an entity or node is a member of a particular membership/group. Groups can be explicit, such as all of my employees as an example, or implicit (e.g., realized from the model and relationships within the model). As shown in FIG. 4, a graph 400 includes a group node 402 named Project A. The group node 402 is connected to member node 406 by an edge 408. The member node 406 is named Erik. The group node 402 is also connected to member node 404 by an edge 410. The member node 404 is named Lars. Therefore, the graph 400 indicates that both Erik (member node 406) and Lars (member node 404) are members of Project A (group node 402).

Figure 5:
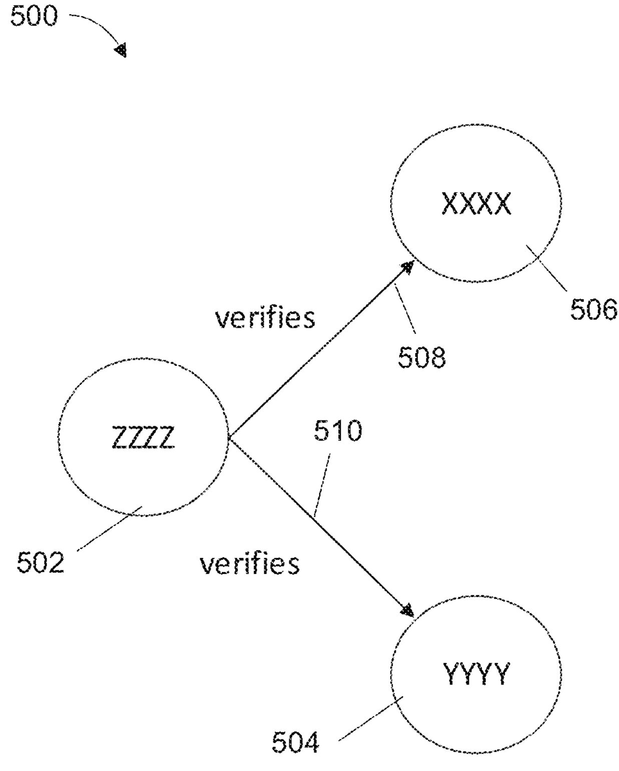
FIG. 5 is a block diagram illustrating an example of identity verification or verifications concepts in general used according to some embodiments of the disclosure.

FIG. 5 is a block diagram illustrating an example of identity verification or verification, in general. As shown, a graph 500 includes an entity node 502 named ZZZZ, an entity node 504 named YYYY, and an entity node 506 named XXXX. The graph 500 depicts that node 502 (ZZZZ) is connected to node 506 (XXXX) by an edge 508. The graph 500 also depicts that node 502 (ZZZZ) is connected to node 504 (YYYY) by an edge 510. The edges 508, 510 point from the node 502 (ZZZZ) to the respective nodes 504 (YYYY) and 506 (XXXX) indicating that a verifiable relationship may be present.

In this example, one entity ZZZZ can verify the identity of another entity XXXX and/or entity YYYY using the systems and methods described herein. For example, the entity XXXX may wish to know an identity of entity YYYY and may wish to know a level of trustworthiness associated with the data used to assess/determine the identity of YYYY. Each verifier (e.g., node 502 ZZZZ) may be associated with a particular uncertainty. That is, the verifiers may have some uncertainty or confidence value of being trusted (or untrusted). Such an uncertainty or confidence value may represent one or more trust metrics. In operation, an entity may be associated with a confidence value generated by a method for verifying a particular relationship between a first entity and another one or more entities (or nodes or statements). Such a method may include a verification process to have a first entity (e.g., node 502 (ZZZZ)) inspect a passport belonging to a second entity (e.g., node 506 (XXXX)). If the first entity (ZZZZ) inspects the passport of the second entity (XXXX), a trust metric (e.g., an uncertainty value and/or a confidence value) can be generated by the systems and methods described herein based on the verification process of having one entity inspect a passport of another entity for particular data or facts. The verification process may include statements, confirmations, or facts associated with the second entity (XXXX) and provided by the first entity (ZZZZ). For example, the first entity (ZZZZ) of node 502 may make a statement such as 'I have known entity XXXX for 5 years' and may assign a trust metric of 0.9 indicating a high level of certainty (e.g., trust) that the first entity ZZZZ has in the validity of the provided statement. The first entity ZZZZ (and/or other entities interested in the outcome of the identity assessment of the first entity) may further add new links, attributes, and/or statements to build an identity assessment/model around identifying the second entity XXXX of node 506.

Similar methods for generating trust metrics representing confidence values and/or uncertainty values may include relationship establishment statements such as, for example, entity 1 knows entity 2 personally, entity 1 is a social network friend of entity 2, or the like. Other methods of verifying identity and/or other facts pertaining to entities or statements may be possible as a process to generate trust metrics (e.g., confidence values and/or uncertainty values). For example, additional entities may add statements such as 'I am connected via social network to entity XXXX' or 'I am not sure if the statement is true', etc. Trust metrics may also be provided with the additional statements indicating a trust that the statement provider has in the first statement or the added statement(s).

In some embodiments, identity-based trust metrics may be generated by performing verification processes for a first entity to generate (or assess) one or more trust metrics defined for each of one or more statements or attributes having an edge connected with the first entity. The one or more trust metrics may be combined to generate an aggregated identity-based uncertainty score (e.g., an aggregated trust metric) that may be used to generate a model for assessing the trustworthiness of the indicated identity of entity XXXX. For example, the aggregated trust metric generator 1014 (FIG. 10) may aggregate the trust metrics to generate an aggregated trust metric for a particular entity, statement, and/or attribute. The aggregated trust metric may be used by one or more neural networks 1020 described herein to formulate a trustworthiness level and a graphical view or user interface representing entities, statements, and/or attributes associated with the entity.

In general, each uncertainty score may have a value in the range of zero to one. A score of zero represents no trust and a high uncertainty. A score of one represents high trust and no uncertainty. Thus, an uncertainty score of about 0.1 to about 0.7 represents weak (or low) trust and high uncertainty. A score of about 0.75 to about 0.8, for example, may represent a medium strong (or medium high) trust and medium uncertainty. A score of about 0.85 to about 0.999999, for example, may represent a strong (or high) trust and low uncertainty. The identity-based uncertainty scores can be combined and averaged to obtain an aggregated identity-based uncertainty score in a similar fashion to the aggregated trust metrics described herein. Such a score may be assessed on the same zero to one scale. Each verification process performed to obtain identity-based uncertainty scores may contribute to reducing the aggregated uncertainty score.

In some embodiments, the graphs described herein may include representations of connections, relations, interactions, and announcements in the form of declarations and understandings, which may also contribute to identity verification. In some embodiments, a verification algorithm to generate the trust metrics (and/or uncertainty metrics) described herein may include using information outside of the identity verification process and may also be subject to the trust metric(s) (and/or uncertainty metrics) associated with other entities and/or statements. In such an example, the systems and methods described herein may utilize contextual information or other input to bias one or more metrics to account for perceived trust. Perceived trust is typically a human trait that is not easily modeled. However, the systems and methods described herein may utilize contexts, inputs, and learned behavior to identify perceived trust and inject such identified elements into a trust network (and/or uncertainty network).

Figure 6:
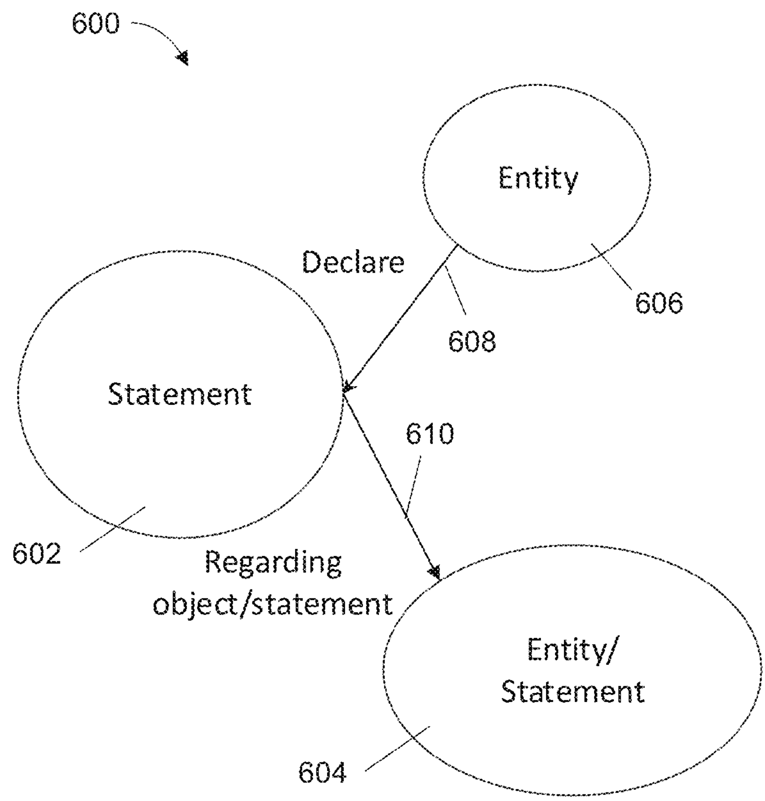
FIG. 6 is a block diagram illustrating an example of the making of a statement by an entity as a concept used according to some embodiments of the disclosure.

FIG. 6 is a block diagram illustrating an example of the making of a statement by an entity. In general, an entity can declare a statement (e.g., make a statement). The statement may follow a subject-verb-object model, for example. A statement is not represented as an edge, but is instead represented as a node. Having an object related to the statement is optional.

As shown in FIG. 6, a graph 600 includes a statement node 602, an entity/statement node 604, and an entity node 606. The entity node 606 represents an entity that declared the statement of statement node 602, as shown by its connection to an edge 608. The statement made by statement node 602 was made regarding an object or other statement associated with entity/statement node 604, as shown by its connection to an edge 610.

Figure 7:
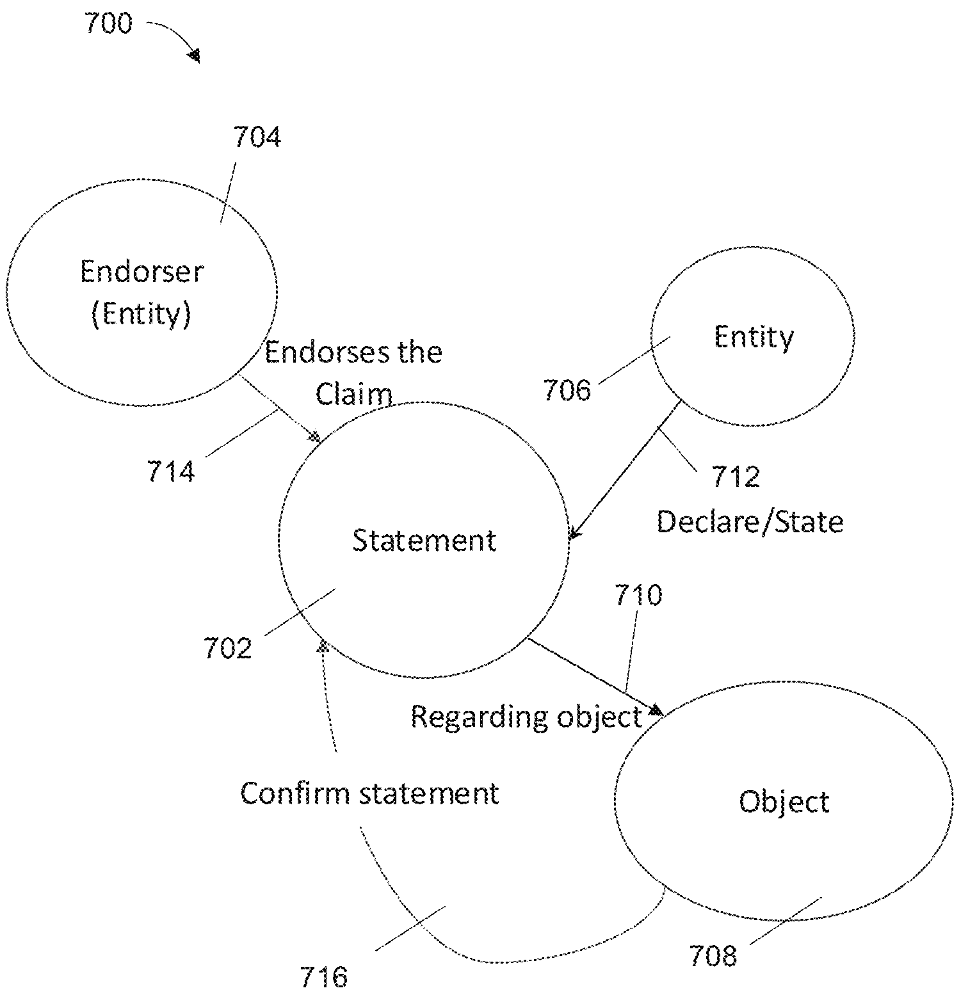
FIG. 7 is a block diagram illustrating an example of a statement endorsement and confirmation concepts used according to some embodiments of the disclosure.

FIG. 7 is a block diagram illustrating an example of a statement endorsement and confirmation. A graph 700 includes a statement node 702, an endorser entity node 704, an entity node 706, and an optional object node 708. The systems and methods described herein may perform a process to confirm a statement made by statement node 702, for example, with a particular level of trust or confidence. For example, a statement (e.g., represented by statement node 702) may be initially unconfirmed and may represent a textual or spoken language statement regarding an object (e.g., represented by object node 708 and edge 710) made by an entity (e.g., represented by entity node 706 and an edge 712). Another entity (e.g., represented by endorser entity node 704) can endorse a statement (e.g., shown by edge 714) to show that they support this statement. Whether or not to support a statement is up to the entity choosing to support it, yet it may represent a type of edge connection (e.g., edge 714).

In some embodiments, an object that is a subject of the statement can endorse the statement, as shown by edge 716. In general, this can be perceived as a stronger endorsement or a more trustworthy endorsement. However, such an assessment/perception may instead be defined and/or selected by the trust algorithm and set of rules implemented by this algorithm. Endorsement of a statement can be aggregated into statement strength showing the level of trustworthiness of the statement. Example statement strength may be indicated using an increase or decrease in a trust metric associated with the particular statement. For example, increasing the trust metric for a statement may increase the level of trustworthiness of the statement. Similarly, decreasing the trust metric for the statement may decrease the level of trustworthiness of the statement.

The level of trustworthiness is typically system specific and could be defined as the level of trust assigned to a particular statement. Trust in a statement is consistently defined as a probability that a particular statement is true within a particular context. One example trust algorithm may include the process 1100 of FIG. 11.

Figure 8:
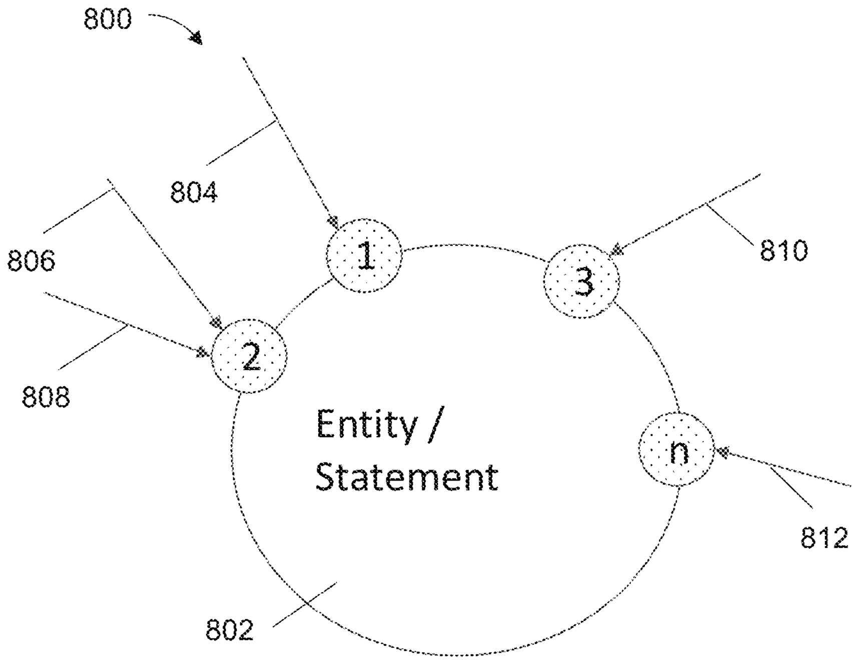
FIG. 8 is a block diagram illustrating an example of an entity or statement having M possible edges connected to [1 . . . n] possible sockets used according to some embodiments of the disclosure.

FIG. 8 is a block diagram illustrating an example graph 800 of an entity 802 (or a statement) with M possible edges connected to [1 . . . n] possible sockets as receiving connection points. The receiving connection points (e.g., 1, 2, 3, n, etc.) allow for multiple edges to connect without limitation. Each receiving connection point represents a socket associated with informational input and a value that is assigned to each respective edge (e.g., 804, 806, 808, 810, 812, etc.) pointing to a respective connection point. The informational input may be provided by (or otherwise relate to) an originator of a respective edge indicated as associated with the informational input.

The socket may define how to handle and/or process the receiving connection information or value. In some embodiments, a socket and received informational input and/or value may be handled with a process (e.g., algorithm) based on the edge type. For example, and as described in FIG. 7, an edge may be a verb or an actionable statement such as "is owner of," which suggests that the originator of the edge (e.g., the directed edge) claims to be the owner of the node that receives this edge. The socket type that receives this edge represents the "ownership claims socket." All inputs to this sockets can be calculated based on edges into this particular socket.

In some embodiments, a trust level of the source of this edge may be the trust level of the owner and the trust of the owner may be transferred to the edge and/or node. Other sockets with an edge may be included. For example, another socket may be included in graph 800. The other socket may indicate that this ownership claim is true, which may increase the trust level of the claim being true using a super set value. To calculate a trust metric based on edges going into sockets, a weighted value per edge may be used. The weighted value may be a value between zero and one. The weighted value per edge may represent a trust metric associated with the source of the edge. The weighted value may be multiplied by the power of the edge, which is also between zero and one. The power of the edge represents a strength of the claim. The strength of the claim may be assessed based on one or more lower or upper threshold values. For example, if the strength/weighted value of a claim is between zero and about 0.5, then the trust metric of a socket may be lowered. If the strength/weighted value of the claim is between about 0.6 and 1, then the trust metric of the socket may be raised. Other threshold values may be used to indicate lowering or raising of trust metrics.

For example, if an ownership claim is weighted as one and the edge may have a weighted value of 0.7. In such an example, a trust metric associated with the ownership claim may be determined by multiplying the weight of the ownership claim (1.0) with the weight of the edge (0.7) to obtain the trust metric of 0.7 (e.g., $1.0\times0.7=0.7$). Adding additional sources (e.g., users, input, machine input, etc.) with claims that this ownership claim is true can function to increase the trust of the original claim by taking the arctangent (e.g., arctan(sum)) of the sum of the trust metrics. to reach a value between zero and one which represents the combined trust metric representing an aggregated trust metric, as described elsewhere herein.

The presence or lack of other edges and edges from other specific objects, entities, and/or statements may influence, dictate or otherwise impact the socket process (e.g., associated with any number of algorithms, activation functions, or the like) via other socket activation by those edges.

In some embodiments, the systems described herein may generate and/or utilize one or more Neural Network (NN) models in which a particular edge provides a power level input. This power level can be multiplied by a weight assigned to the receiving socket to the particular edge. This operation may result in an input into the socket for further activation.

Figure 9:
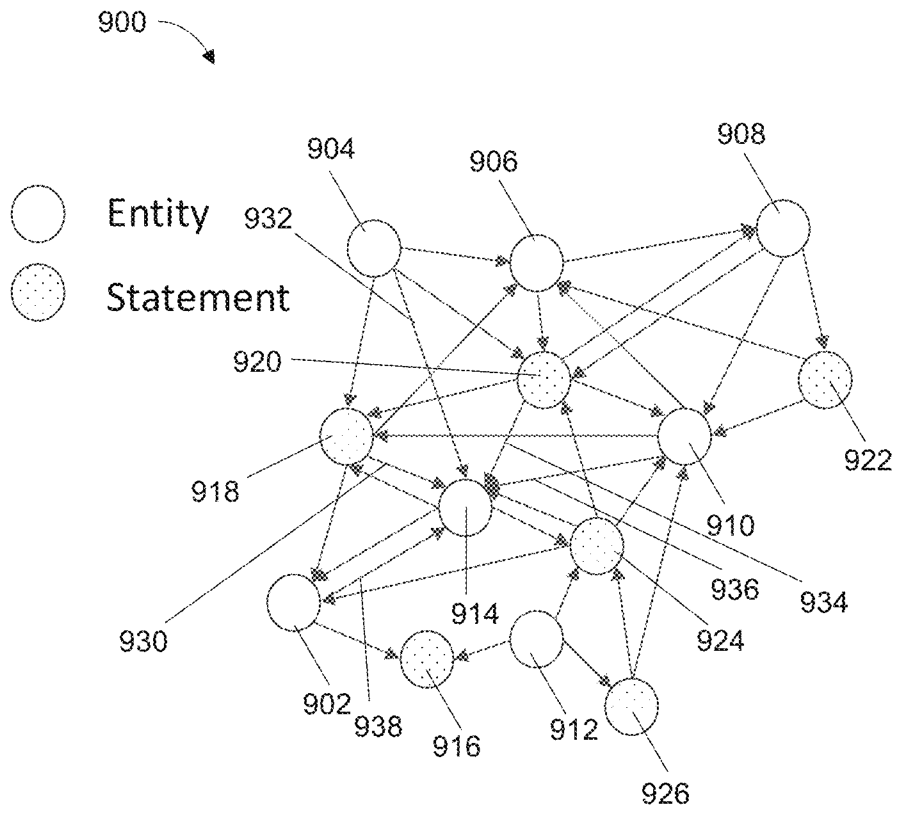
FIG. 9 is a block diagram illustrating an example of the implementation of the trust instantaneous value calculation method.

FIG. 9 is a block diagram illustrating an example of the implementation of the uncertainty score calculation method. The method for calculating the uncertainty score may use a Recursive Neural Network (RNN) like representation of a trust/uncertainty model. In some embodiments, other types of NNs (e.g., NN(s) 1020), such as Recursive Convolutional Neural Networks (R-CNN) may be implemented to determine uncertainty scores. In some embodiments, an uncertainty score may be determined by traversing a graph dataset (data structure) and calculating the results using the same model with or without recursion.

As shown in FIG. 9, a graph 900 includes a number of entity nodes 902, 904, 906, 908, 910, 912, and 914 and a number of statement nodes 916, 918, 920, 922, 924, and 926. Each connection (e.g., edge/arrow) connects into a specific socket type that defines the connection and the algorithm (e.g., one or more activation functions) to execute upon the input data. Each edge/arrow is created by an entity.

Example socket types can include indicators such as "I trust this statement" socket type, or "I trust this statement within the context" socket type, or "I trust this entity" socket type, or "I know this to be true within context," just to name a few examples.

An example of a connection type may include a permanent connection that is not limited by time and denotes a permanent value or weight imposed by the source of the connection. The weight may be based on the source trust or any other characteristics associated with a statement or source. Another example connection type may include a time-dependent connection that may have a weight that can weaken over time.

Example algorithms that may be used with the systems described herein can include arctan(a), where 'a' represents the sum of all the inputs multiplied by the weights of the inputs. Determining the arctangent of a set of inputs may also be performed to determine a node value for any of the graphs (e.g., neural networks) described herein. The value of the power a node has on a particular connection (or other node) may be determined by calculating the weight multiplied by the trust value of a claim (or edge) originator. Such powers and/or weights may be algorithm-dependent and can be learned over time.

The systems described herein can generate a trust/uncertainty model based on the graph 900. Thus, each value or power on a connection may represent a trust score and/or an uncertainty score. The entity may choose the strength of this output signal. For this example, a value between zero and one can be used, where zero represents no trust and one represents a maximum trust score. Similarly, we can also define these values as uncertainty scores, where zero represents no certainty and one represents full certainty.

In some embodiments, an entity can also be an observer. When an entity is an observer, a new input link may be generated between the observer and any other entity, statement, or combination thereof. This link may be used to inject uncertainty influence on these objects that is immediately reflected in the connected entities and statements and the corresponding trust scores and/or certainty scores. Thus, the input (e.g., input 1002) described herein may include and account for personal, user-based statement(s) about particular objects, statements, and/or other entities which may be used to model and assess trust and uncertainty of relationships amongst entities, objects, and/or statements.

Figure 10:
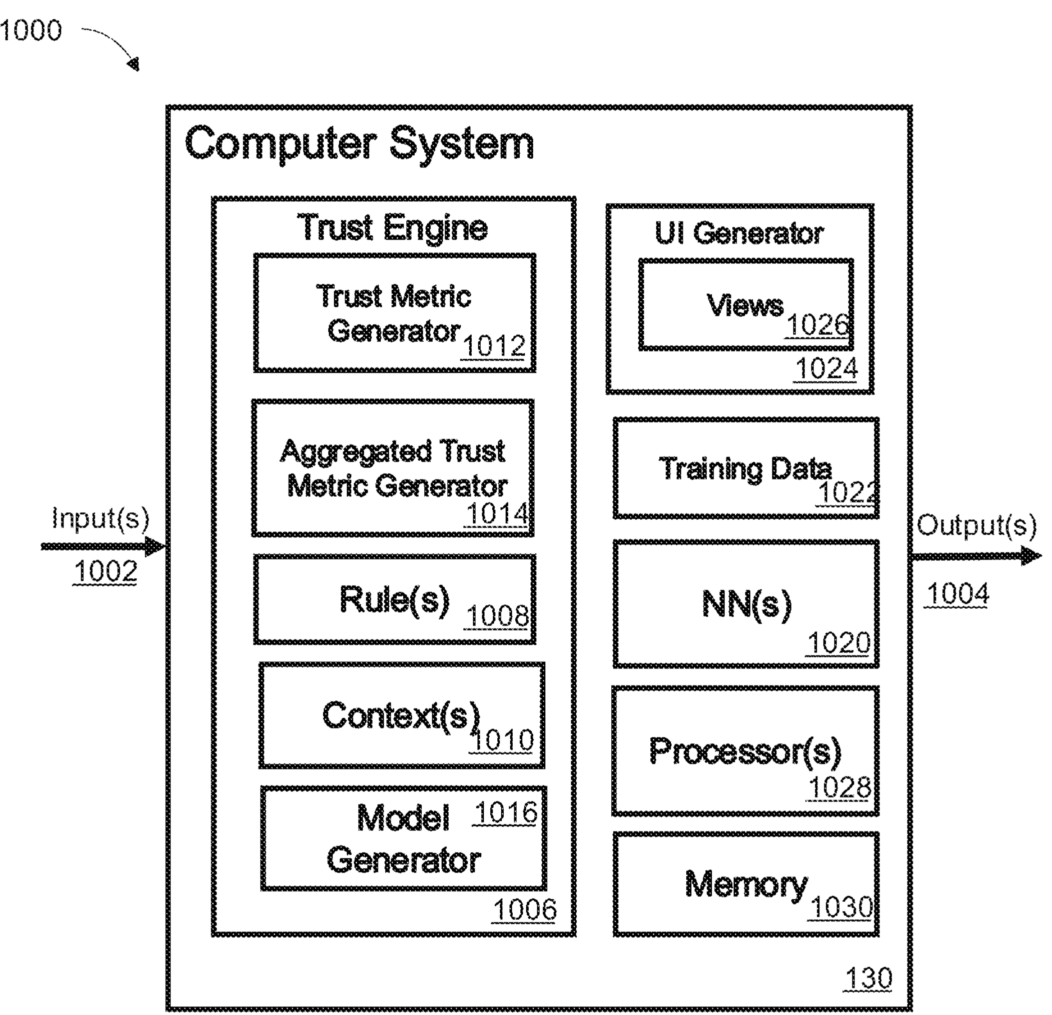
FIG. 10 is a block diagram of a computer system for generating a model to determine trustworthiness of a system, entity, or statement.

FIG. 10 is a block diagram of a computer system 1000 for generating a model to determine trustworthiness of a system, entity, or statement. The system 1000 may include a computer system 130 as described above. The system 1000 may use inputs 1002 to generate outputs such as metrics and models that may assess and determine trust (e.g., trustworthiness) of entities and statements. In some embodiments, the metrics and models can be used to assess and determine trust between the entities and statements, determine trust between the entities and other entities, and/or determine trust between the statements and other statements.

The system 1000 may include a trust engine 1006 for managing and performing computations on data from which trust metrics can be extracted. The data my include statements and or relationship data that may be assessed according to agreement based trust corresponding to an entity agreeing with output received from another entity, community based trust which corresponds to an experience of a community of entities that are interrelated, and/or association based trust corresponding to a relationship type between the two entities.

The trust engine 1006 may include logic and generators for computing trust metrics, aggregated trust metrics, and models for assess a trustworthiness of any number of nodes (e.g., entities, statements, etc.) of a particular trust network. The logic may include rules 1008 and contexts 1010. In some embodiments, the rules 1008 and/or contexts 1010 may be predefined by the system 1000. In some embodiments, the rules 1008 and/or contexts 1010 may be influenced, modified, or updated according to one or more learning inputs, model inputs, and/or parameters. In some embodiments, the learning inputs, model inputs, and/or parameters may be received as an input from a user. In some embodiments, the learning inputs, model inputs, and/or parameters may be received as an input from a computing device communicatively coupled to computer system 130.

The trust engine 1006 may also include a trust metric generator 1012 and an aggregated trust metric generator 1014. The trust metric generator 1012 may function to generate one or more metrics between zero and one which may represent a trust level for particular entities, statements, or edges as indicated by any number of entities associated with the particular entities, statements, or edges. In some embodiments, the trust metrics may be received as input 1002 to the system rather than generated by the system. Updated trust metrics may be generated by trust metric generator 1012 in order to update such trust metrics when additional data is available.

The aggregated trust metric generator 1014 may function to aggregate the trust metrics associated with each node, statement, entity, edge, etc. to generate an aggregated trust metric for a generated model. The aggregated trust metric may represent an indication of trust (e.g., a trust level) of a particular entity based on the trust metrics identified/generated for each statement, node, edge, or other entity having a defined relationship (e.g., edge connection) to the particular entity.

The trust engine 1006 may further include a model generator 1016. The model generator 1016 may generate models representing a trust network or an uncertainty network generated on behalf of one or more of the entities/nodes in the model. For example, a model may represent a trustworthiness (or a lack of trustworthiness) of a first entity given a plurality of trust metrics captured/generated for other nodes/entities having defined relationships with the first entity.

The system 1000 may include one or more neural networks (NNs) 1020 (e.g., associated with one or more machine learning models). The NNs 1020 may include one or more activation functions executable on various nodes within a particular model. Each NN 1020 may represent a neuroevolutionary model that includes at least one network and/or activation function that may be evolved based on competition between populations of neural networks (NNs) all trying to achieve a particular goal (or set of goals), such as identifying trustworthiness of one or more node, entity, or statement. The NNs 1020 may be trained using training data 1022. As an example, each socket type may be represented by its own NN, and a node in this network is typically a socket in the original system/graph. After calculating the values of all NNs, the system 1000 can sum all the nodes related to a single node (as sockets) and generate a new trust metric that is the sum of these values using arctangent function (e.g., arctan(sum)).

The system 1000 may include user interface (UI) generator 1024 for generating visual output 1004 representing the models, metrics, and/or relationships amongst nodes, entities, and statements described herein. The UI generator 1024 may generate any number of views 1026 (e.g., user interfaces) depicting trustworthiness levels, modeled relationships and/or trust metrics associated with such relationships.

The system 1000 can include one or more processor(s) 1028 and memory 1030. The processor(s) 1028 may include one or more hardware processors, including microcontrollers, digital signal processors, application specific integrated circuit (ASIC), a field programmable gate array (FPGA) or other programmable logic device, discrete gate or transistor logic, discrete hardware components, or any combination thereof designed to perform the functions described herein and/or capable of executing instructions, such as instructions stored by the memory 1030. The processors 1028 may also be able to execute instructions for performing communications amongst computer system 130, NNs 1020, UI generator 1024, and trust engine 1006, and/or external computing device that are communicatively coupled to system 130.

The memory 1030 can include one or more non-transitory computer-readable storage media. The memory 1030 may store instructions and data that are usable in combination with processors 1028 to execute algorithms/processes described herein, machine learning models and NNs 1020, and UI generator 1024, and/or other applications (not shown) or application programming interfaces (not shown). The memory 1030 may also function to store or have access to the trust engine 1006, inputs 1002, and/or outputs 1004.

The system 1000 may further include or be communicatively coupled to input devices (not shown) and/or output devices (not shown) to allow users to interface with the system 130.

In operation, the system 130 may receive or obtain inputs 1002 and use the inputs 1002 to generate outputs 1004. Example inputs may include statements, trust metrics, contexts, rules or the like. Example outputs may include models for assessing trustworthiness, updated trust metrics, aggregated trust metrics, user interfaces, model views, maps or graphs depicting trustworthiness of statements or entities, and/or other representation of trust-based metrics.

Figure 11:
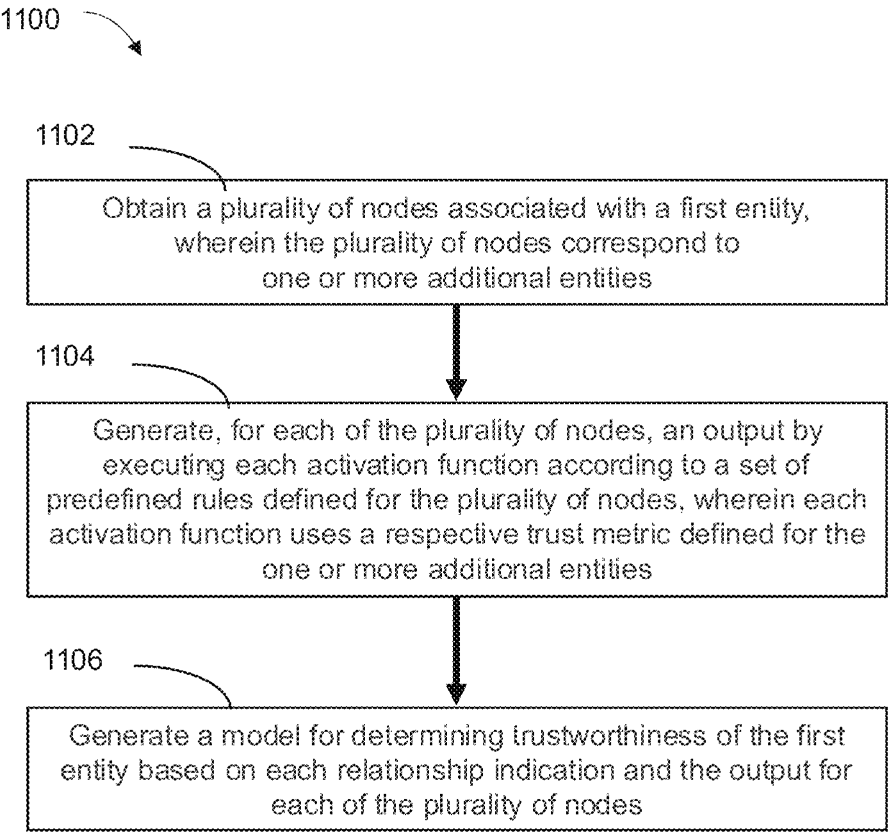
FIG. 11 is an example flow diagram of a process for identifying trustworthiness of a system, entity, or statement.

FIG. 11 is an example flow diagram of a process 1100 for identifying trustworthiness of a system, entity, or statement. The methods described herein represent computer-implemented methods that can be executed on the system of FIG. 1 on the computer system 130, for example. The computer system 130 may include any or all of the components depicted in FIG. 10. One skilled in the art will appreciate that other components and/or duplicative components to system 130 may also be used to carry out the steps of the process 1100.

At block 1102, the process 1100 may include obtaining a plurality of nodes (e.g., nodes, entities, or statements 902, 904, 906, 908,910, 912, 916, 918, 920, 922, 924, and 926 associated with a first entity (e.g., node/entity 914). The plurality of nodes may correspond to one or more additional entities or statements. For example, the plurality of nodes 902-912 and 916-926 may be connected by one or more edges to any number of other nodes and/or any of the nodes 902-912, 914, and 916-926. Each of the one or more additional entities may be defined by a trust metric, a relationship indication, and at least one activation function. For example, each of the nodes 902-912 and 916-926 may be defined by a trust metric indicated by a respective entity associated with the respective node in nodes 902-912 and 916-926. The trust metric may represent a defined portion of an entity or statement that values a level of trust in the entity and/or statement associated with the metric. The trust metric may be valued between zero and one, where zero represents no trust and one represents full trust. Similarly, uncertainty may be numerically represented as an uncertainty metric between zero and one, where zero represents no uncertainty and one represents full uncertainty. Thus, an uncertainty metric may be determined using the equation 1−trust (i.e., 1 minus the trust metric).

A relationship indication may represent how and/or why particular nodes are connected by an edge to one another. For example, in a social network, an edge may represent that two users (e.g., nodes) are connected, but the relationship indication may further specify that one user follows the other or one user requested a connection of the other user. In the example of statements having relationship indications, a first statement may be a response or reaction to a second statement and thus, the relationship indication may specify that the first statement is a comment and the second statement is a response or reaction to the comment. Other examples are, of course, possible and one skilled in the art will appreciate that other types of relationship indications may be held between nodes, two or more nodes, groups of nodes, etc.

In a non-limiting example, each of the nodes 902-912 and 916-926 may also have a relationship indication defined by the edge connection that is connecting a node to another one or more nodes. The edges may further specify how the nodes (or data associated with the nodes) relate to one another, as described in detail in FIG. 9.

Each of the nodes 902-912 and 916-926 may also be defined by at least one activation function that includes instructions for executing algorithms for assessing trustworthiness based on data defined for a particular node and statements and/or data received at the particular node. For example, a statement represented by node 918 may be made by an entity associated with node 918. The statement may refer to an aspect about the entity 914 as indicated by arrow 930. The aspect may include a fact about entity 914, a declaration about entity 914, an opinion about entity 914, or other input about entity 914. Each aspect may also include a trust metric score between zero and one indicating a probability (e.g., likelihood or confidence) that the aspect is true.

At block 1104, the process 1100 may include generating, for each of the plurality of nodes, an output by executing each activation function according to a set of predefined rules defined for the plurality of nodes. In some embodiments, the set of predefined rules may include a plurality of learning rules that when used during execution of each activation function modify at least one trust metric of at least one of the plurality of nodes and generates, using the model and the at least one modified trust metric, an updated aggregated trust metric. For example a learning rule can assessing a chain of nodes with trust cascaded between them, and setting a rule that decreases the trust based on distance. For example, the input weight of trust may be divided by the number of edges between the node and the source. This means that if user A trusts user B and user B trusts user C, the trust of user A in user C is 50% of the trust metric of user B (i.e., 50% of user B's trust in user C).

For example, an activation function may assess any number of statements or input available for a node 914. In the example of FIG. 9, the additional statements/input include data/edges 930, 932, 934, 936, and 938. In general, each activation function may use a respective trust metric defined for the one or more additional entities (e.g. nodes 902-912 and nodes 916-926). For example, the trust metric for each node associated with the entity of node 914 may be used as part of an assessment of trustworthiness of the entity of node 914. The trust metrics each provide another level of trust (or distrust) that may be accounted for using the predefined rules and the logic in the activation functions when assessing trustworthiness of the entity of node 914.

At block 1106, the process 1100 may include generating a model for determining trustworthiness of the first entity based on each relationship indication and the output for each of the plurality of nodes. The model generated by process 1100 may represent a cascade of trust that may be modified in response to receiving updated statements, additional statements, updated trust metrics, or the like. The model may be generated and regenerated in near real time to ensure that an up to date trust network is available. The model may provide a near instantaneous assessment of trustworthiness by executing each activation function for each node in a particular network.

In some embodiments, the process 1100 may receive one or more updated trust metrics and/or other data associated with one or more of the plurality of nodes associated with the first entity of node 914, for example. In response to receiving one or more updated trust metrics associated with one or more of the plurality of nodes associated with the first entity of node 914, the process 1100 may include generating an updated model based on the one or more updated trust metrics and the respective activation functions associated with additional entities (e.g., nodes) having an updated trust metric. The process 1100 may use the updated model to generate an updated aggregated trust metric and a graphical user interface of the model based on the updated aggregated trust metric.

Further, in some embodiments, the process 1100 may be biased or influenced by one or more additional nodes, entities, statements, or the like. For example, in some embodiments, the process 1100 may include receiving an additional node and/or data from the additional node (e.g., statement of edge 930) from a second entity (e.g., of node 918). The additional node 918 may be defined by at least one trust indicator (e.g., a zero to one numerical score) and a relationship (e.g., a friend edge connection) to the first entity (associated with node 914). The process may use the generated model to generate an aggregated trust metric for the first entity (associated with node 914) and then may then use the at least one trust indicator to bias the aggregated trust metric. In this way, additional information can bias the trustworthiness assessment after other assessments have been generated. The process 1100 may also generate a graphical view (e.g., graphical user interface) of the model or data associated with the model. Such a view may graphically depict an influence of the at least one trust indicator on the model/trustworthiness of the entity of node 914. In some embodiments, the aggregated trust metric represents a probability of the first entity being trustworthy. In such examples, adding in the at least one trust indicator when assessing trustworthiness may modify the probability.

In some embodiments, each node 902-912 and nodes 916-926 is a statement or entity associated with the first entity (e.g., node 914). In such examples, the generated model may be a trust network including a plurality of neural networks (e.g., NNs 1020) configured to execute, in parallel, each activation function to generate an aggregated trust metric for the first entity of node 914 based on the trust metric and relationship indication for each respective statement or entity of nodes 902-912 and nodes 916-926. In some embodiments, the trust network represents an uncertainty network influenced by one or more entities (e.g., users, organizations, etc.) associated with one or more of the plurality of nodes 902-912 and nodes 916-926.

In some embodiments, the process 1100 may begin by receiving a request to determine trustworthiness of the first entity. For example, the system 130 may receive a request by a machine or a user to assess the trustworthiness of the entity represented by node 914. The request may include at least one parameter. For example, the request may include a node or entity indicator, a relationship indicator, a statement, a rule indicator, a group indicator, a context indicator, a time range indicator, or other indicator.

In some embodiments, the process 1100 may include generating, using the model and the at least one parameter, an aggregated trust metric for the first entity represented by node 914 and may further generate a graphical view of the model based on the aggregated trust metric. In some embodiments, the aggregated trust metric represents a probability of the first entity 914 (and/or associated statements) being trustworthy.

In some embodiments, the plurality of nodes (e.g., nodes 902-912 and nodes 916-926) may be conditioned on at least one node context. In some embodiments, generating of the output for each of the plurality of nodes is based on feeding the at least one node context into at least one of the activation functions. For example, a portion of nodes 902-912 and nodes 916-926) may have a node context of being nodes that have been added to the network within the last six months. Such a context may further bias the model generation/assessment toward relying more on nodes that are older than six month by weighting statements of older nodes heavier than statements from newer nodes.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method for determining trustworthiness, the method comprising:

obtaining a plurality of nodes associated with a first entity, wherein the plurality of nodes correspond to one or more additional entities, each of the one or more additional entities being defined by a trust metric, a relationship indication, and at least one activation function;

generating, for each of the plurality of nodes, an output by executing each activation function according to a set of predefined rules defined for the plurality of nodes, wherein each activation function uses a respective trust metric defined for the one or more additional entities, wherein the set of predefined rules is applied by a neuroevolutionary model in which populations of neural networks compete to achieve a trust identification goal such that each activation function is evolved based on the competition between the populations of neural networks; and generating a model for determining trustworthiness of the first entity based at least in part on each relationship indication and the output for each of the plurality of nodes, wherein generating the model comprises receiving observer-based input from at least one entity acting as an observer and injecting an uncertainty influence derived from the observer-based input directly into one or more of the plurality of nodes such that the uncertainty influence is reflected in the respective trust metrics and aggregated trust output associated with the one or more plurality of nodes.

2. The computer-implemented method of claim 1, further comprising:

receiving a request to determine trustworthiness of the first entity, the request including at least one parameter;

generating, using the model and the at least one parameter, an aggregated trust metric for the first entity; and generating a graphical view of the model based on the aggregated trust metric.

3. The computer-implemented method of claim 1, wherein:

each node is a statement or entity associated with the first entity; and the model is a trust network comprising a plurality of neural networks configured to execute, in parallel, each activation function to generate an aggregated trust metric for the first entity based on the trust metric and relationship indication for each statement or entity.

4. The computer-implemented method of claim 3, wherein the trust network represents a network in which each of the one or more entities associated with one or more of the plurality of nodes is defined by an uncertainty metric, wherein the uncertainty metric is determined as one minus the trust metric of the respective entity, the uncertainty metric having a value between zero and one, wherein zero represents no uncertainty and one represents full uncertainty, and wherein the uncertainty metric of each entity influences the aggregated trust metric generated by the trust network.

5. The computer-implemented method of claim 1, further comprising:

receiving an additional node from a second entity, the additional node being defined by at least one trust indicator and a relationship to the first entity;

generating, using the model, an aggregated trust metric for the first entity;

biasing the aggregated trust metric according to the at least one trust indicator; and generating a graphical view of the model, the graphical view depicting an influence of the at least one trust indicator.

6. The computer-implemented method of claim 5, wherein:

the aggregated trust metric represents a probability of the first entity being trustworthy; and the at least one trust indicator modifies the probability.

7. The computer-implemented method of claim 1, further comprising:

in response to receiving one or more updated trust metrics associated with one or more of the plurality of nodes associated with the first entity:

generating an updated model based on the one or more updated trust metrics and the respective activation functions associated with additional entities having an updated trust metric; and generating, using the updated model, an updated aggregated trust metric and generating a graphical user interface of the model based on the updated aggregated trust metric.

8. The computer-implemented method of claim 1, wherein:

the plurality of nodes are conditioned on at least one node context; and the generating of the output for each of the plurality of nodes is based on feeding the at least one node context into at least one of the activation functions.

9. The computer-implemented method of claim 1, wherein:

the set of predefined rules comprises a plurality of learning rules that when used during execution of each activation function:

modifies at least one trust metric of at least one of the plurality of nodes; and generates, using the model and the at least one modified trust metric, an updated aggregated trust metric.

10. A system comprising:

at least one processing device; and memory storing instructions that when executed cause the processing device to perform operations comprising:

obtaining a plurality of nodes associated with a first entity, wherein the plurality of nodes correspond to one or more additional entities, each of the one or more additional entities being defined by a trust metric, a relationship indication, and at least one activation function;

generating, for each of the plurality of nodes, an output by executing each activation function according to a set of predefined rules defined for the plurality of nodes, wherein each activation function uses a respective trust metric defined for the one or more additional entities, wherein the set of predefined rules is applied by a neuroevolutionary model in which populations of neural networks compete to achieve a trust identification goal such that each activation function is evolved based on the competition between the populations of neural networks; and generating a model for determining trustworthiness of the first entity based at least in part on each relationship indication and the output for each of the plurality of nodes, wherein generating the model comprises receiving observer-based input from at least one entity acting as an observer and injecting an uncertainty influence derived from the observer-based input directly into one or more of the plurality of nodes such that the uncertainty influence is reflected in the respective trust metrics and aggregated trust output associated with the one or more plurality of nodes.

11. The system of claim 10, wherein the operations further comprise:

receiving a request to determine trustworthiness of the first entity, the request including at least one parameter;

generating, using the model and the at least one parameter, an aggregated trust metric for the first entity; and generating a graphical view of the model based on the aggregated trust metric.

12. The system of claim 10, wherein:

each node is a statement or entity associated with the first entity; and the model is a trust network comprising a plurality of neural networks configured to execute, in parallel, each activation function to generate an aggregated trust metric for the first entity based on the trust metric and relationship indication for each statement or entity.

13. The system of claim 12, wherein the trust network represents a network influenced by one or more entities associated with one or more of the plurality of nodes, wherein each of the one or more entities is defined by an uncertainty metric having a value between zero and one determined as one minus the respective trust metric.

14. The system of claim 10, wherein the operations further comprise:

receiving an additional node from a second entity, the additional node being defined by at least one trust indicator and a relationship to the first entity;

generating, using the model, an aggregated trust metric for the first entity;

biasing the aggregated trust metric according to the at least one trust indicator; and generating a graphical view of the model, the graphical view depicting an influence of the at least one trust indicator.

15. The system of claim 14, wherein:

the aggregated trust metric represents a probability of the first entity being trustworthy; and the at least one trust indicator modifies the probability.

16. The system of claim 10, wherein the operations further comprise:

in response to receiving one or more updated trust metrics associated with one or more of the plurality of nodes associated with the first entity:

generating an updated model based on the one or more updated trust metrics and the respective activation functions associated with additional entities having an updated trust metric; and generating, using the updated model, an updated aggregated trust metric and generating a graphical user interface of the model based on the updated aggregated trust metric.

17. The system of claim 10, wherein:

the plurality of nodes are conditioned on at least one node context; and the generating of the output for each of the plurality of nodes is based on feeding the at least one node context into at least one of the activation functions.

18. The system of claim 10, wherein:

the set of predefined rules comprises a plurality of learning rules that when used during execution of each activation function:

modifies at least one trust metric of at least one of the plurality of nodes; and generates, using the model and the at least one modified trust metric, an updated aggregated trust metric.

19. A non-transitory computer-readable medium comprising:

at least one processor; and a memory storing instructions that, when executed by the at least one processor, cause the at least one processor to perform operations comprising:

obtaining a plurality of nodes associated with a first entity, wherein the plurality of nodes correspond to one or more additional entities, each of the one or more additional entities being defined by a trust metric, a relationship indication, and at least one activation function;

generating, for each of the plurality of nodes, an output by executing each activation function according to a set of predefined rules defined for the plurality of nodes, wherein each activation function uses a respective trust metric defined for the one or more additional entities, wherein the set of predefined rules is applied by a neuroevolutionary model in which populations of neural networks compete to achieve a trust identification goal such that each activation function is evolved based on the competition between the populations of neural networks; and generating a model for determining trustworthiness of the first entity based at least in part on each relationship indication and the output for each of the plurality of nodes, wherein generating the model comprises receiving observer-based input from at least one entity acting as an observer and injecting an uncertainty influence derived from the observer-based input directly into one or more of the plurality of nodes such that the uncertainty influence is reflected in the respective trust metrics and aggregated trust output associated with the one or more plurality of nodes.

20. The non-transitory computer-readable medium of claim 19, wherein the operations further comprise:

receiving a request to determine trustworthiness of the first entity, the request including at least one parameter;

generating, using the model and the at least one parameter, an aggregated trust metric for the first entity; and generating a graphical view of the model based on the aggregated trust metric.

21. The non-transitory computer-readable medium of claim 19, wherein:

each node is a statement or entity associated with the first entity; and the model is a trust network comprising a plurality of neural networks configured to execute, in parallel, each activation function to generate an aggregated trust metric for the first entity based on the trust metric and relationship indication for each statement or entity.

22. The non-transitory computer-readable medium of claim 21, wherein the trust network represents a network influenced by one or more entities associated with one or more of the plurality of nodes, wherein each of the one or more entities is defined by an uncertainty metric having a value between zero and one determined as one minus the respective trust metric.

23. The non-transitory computer-readable medium of claim 19, wherein the operations further comprise:

receiving an additional node from a second entity, the additional node being defined by at least one trust indicator and a relationship to the first entity;

generating, using the model, an aggregated trust metric for the first entity;

biasing the aggregated trust metric according to the at least one trust indicator; and generating a graphical view of the model, the graphical view depicting an influence of the at least one trust indicator.

24. The non-transitory computer-readable medium of claim 23, wherein:

the aggregated trust metric represents a probability of the first entity being trustworthy; and the at least one trust indicator modifies the probability.

25. The non-transitory computer-readable medium of claim 19, wherein the operations further comprise:

in response to receiving one or more updated trust metrics associated with one or more of the plurality of nodes associated with the first entity:

generating an updated model based on the one or more updated trust metrics and the respective activation functions associated with additional entities having an updated trust metric; and generating, using the updated model, an updated aggregated trust metric and generating a graphical user interface of the model based on the updated aggregated trust metric.

26. The non-transitory computer-readable medium of claim 19, wherein:

the plurality of nodes are conditioned on at least one node context; and the generating of the output for each of the plurality of nodes is based on feeding the at least one node context into at least one of the activation functions.

27. The non-transitory computer-readable medium of claim 19, wherein:

the set of predefined rules comprises a plurality of learning rules that when used during execution of each activation function:

modifies at least one trust metric of at least one of the plurality of nodes; and generates, using the model and the at least one modified trust metric, an updated aggregated trust metric.

28. A computer-implemented method for determining trustworthiness, the method comprising:

obtaining a plurality of nodes associated with a first entity, wherein the plurality of nodes correspond to one or more additional entities, each of the one or more additional entities being defined by a trust metric, a relationship indication, and at least one activation function;

generating, for each of the plurality of nodes, an output by executing each activation function according to a set of predefined rules defined for the plurality of nodes using a parallel computational framework comprising a plurality of neural networks configured to execute each activation function concurrently, wherein each neural network corresponds to a respective socket type that defines an algorithm to execute upon input data received at the respective node and wherein each activation function uses a respective trust metric defined for the one or more additional entities; and generating a model for determining trustworthiness of the first entity based at least in part on each relationship indication and the output for each of the plurality of nodes, wherein the model is a trust network generated by the parallel computational framework in which each socket type independently processes its received input data according to the algorithm defined for that socket type and collectively produces an aggregated trust metric for the first entity by summing the outputs across the plurality of neural networks and applying an arctangent function to the sum.

* * * * *